United States Patent
Wei et al.

(10) Patent No.: US 10,939,127 B2
(45) Date of Patent: Mar. 2, 2021

(54) METHOD AND APPARATUS FOR TRANSMISSION OF SUBSTREAMS OF VIDEO DATA OF DIFFERENT IMPORTANCE USING DIFFERENT BEARERS

(71) Applicant: HUAWEI TECHNOLOGIES CO., LTD., Guangdong (CN)

(72) Inventors: Dongdong Wei, Shanghai (CN); Qiling Ni, Shanghai (CN); Guohua Zhou, Shanghai (CN)

(73) Assignee: HUAWEI TECHNOLOGIES CO., LTD., Guangdong (CN)

( * ) Notice: Subject to any disclaimer, the term of this patent is extended or adjusted under 35 U.S.C. 154(b) by 0 days.

(21) Appl. No.: 16/179,815

(22) Filed: Nov. 2, 2018

(65) Prior Publication Data

US 2019/0075308 A1    Mar. 7, 2019

Related U.S. Application Data

(63) Continuation of application No. PCT/CN2016/081174, filed on May 5, 2016.

(51) Int. Cl.
*H04N 19/169* (2014.01)
*H04N 21/63* (2011.01)
(Continued)

(52) U.S. Cl.
CPC ......... *H04N 19/188* (2014.11); *H04L 65/608* (2013.01); *H04L 69/168* (2013.01);
(Continued)

(58) Field of Classification Search
CPC .... H04N 19/00; H04N 19/188; H04N 19/129; H04N 19/172; H04N 19/176;
(Continued)

(56) References Cited

U.S. PATENT DOCUMENTS 7,684,430 B2 *   3/2010   Gaur .................. H04W 74/0816
                                                            370/230
2001/0048662 A1 * 12/2001  Suzuki ..................... H04L 47/32
                                                            370/230

(Continued)

FOREIGN PATENT DOCUMENTS

CN     102665109 A     9/2012
CN     103442391 A    12/2013
(Continued)

OTHER PUBLICATIONS

T-REC-H.264-201602-S!!PDF-E Series H: Audiovisual and Multimedia SystemsInfrastructure of audiovisual services—Coding of moving video-Advanced video coding for generic audiovisual services, ITU-T-Telecommunication Standardization Sector of ITU, International Telecommunication Union,total 807 pages.

(Continued)

*Primary Examiner* — David E Harvey
(74) *Attorney, Agent, or Firm* — Womble Bond Dickinson (US) LLP

(57) ABSTRACT

A video service transmission method and apparatus in the field of communications technologies are provided, where data in a video data frame can be split into at least two substreams based on a mapping relationship between data importance and a substream. The data of the at least two substreams may then be mapped, based on port numbers corresponding to the at least two substreams, to bearers corresponding to the at least two substreams, for transmission. Because a network can use different processing methods for data on different bearers, reliable transmission of video data frames of high importance can be ensured with priority by using the video service transmission method and apparatus, so as to improve service experience of video users in a scenario of constrained transmission resources.

18 Claims, 11 Drawing Sheets

(51) Int. Cl.
  *H04N 21/643* (2011.01)
  *H04N 21/647* (2011.01)
  *H04N 19/129* (2014.01)
  *H04N 19/172* (2014.01)
  *H04N 19/174* (2014.01)
  *H04N 19/176* (2014.01)
  *H04N 19/61* (2014.01)
  *H04L 29/06* (2006.01)
  *H04M 15/00* (2006.01)
  *H04W 8/08* (2009.01)

(52) U.S. Cl.
  CPC ......... *H04N 19/129* (2014.11); *H04N 19/172* (2014.11); *H04N 19/174* (2014.11); *H04N 19/176* (2014.11); *H04N 19/61* (2014.11); *H04N 21/63* (2013.01); *H04N 21/643* (2013.01); *H04N 21/647* (2013.01); *H04M 15/66* (2013.01); *H04W 8/08* (2013.01)

(58) Field of Classification Search
  CPC ...... H04N 19/61; H04N 21/63; H04N 21/643; H04N 21/647; H04N 21/234327; H04N 21/631; H04N 21/2385; H04N 21/2381; H04N 19/169; H04L 47/2433; H04L 47/2408; H04L 47/805; H04L 65/80; H04L 65/602
  USPC .......................................... 375/240.1–240.29
  See application file for complete search history.

(56) References Cited

U.S. PATENT DOCUMENTS

| | | | |
|---|---|---|---|
| 2003/0009764 A1* | 1/2003 | Krishnamachari | H04N 19/37 725/93 |
| 2005/0013249 A1* | 1/2005 | Kong | H04L 65/4084 370/235 |
| 2006/0168133 A1* | 7/2006 | Park | H04L 65/80 709/219 |
| 2008/0020775 A1* | 1/2008 | Willars | H04L 47/2441 455/445 |
| 2008/0052605 A1* | 2/2008 | Luo | H04N 19/67 714/776 |
| 2009/0028151 A1* | 1/2009 | Schmidt | H04N 21/2385 370/392 |
| 2009/0175353 A1* | 7/2009 | Suh | H04N 19/30 375/240.25 |
| 2009/0201809 A1* | 8/2009 | Sommerville | H04L 47/783 370/232 |
| 2010/0049865 A1* | 2/2010 | Hannuksela | H04N 21/234327 709/231 |
| 2010/0189063 A1* | 7/2010 | Kokku | H04L 47/32 370/329 |
| 2011/0038386 A1* | 2/2011 | Berthelot | H04N 21/234327 370/474 |
| 2011/0128923 A1* | 6/2011 | Cilli | H04N 21/4223 370/329 |
| 2011/0267951 A1* | 11/2011 | Stanwood | H04L 41/5022 370/235 |
| 2012/0030723 A1* | 2/2012 | Baum | H04N 21/234327 725/105 |
| 2013/0286885 A1* | 10/2013 | Hwang | H04L 43/0852 370/252 |
| 2014/0036999 A1* | 2/2014 | Ryu | H04N 19/70 375/240.12 |
| 2015/0095454 A1 | 4/2015 | Shang | |
| 2015/0229970 A1* | 8/2015 | Ma | H04L 65/80 370/260 |
| 2019/0089966 A1* | 3/2019 | Mandapadi Ramasubramanian | H04N 19/188 |

FOREIGN PATENT DOCUMENTS

| | | |
|---|---|---|
| CN | 104506959 A | 4/2015 |
| CN | 105392068 A | 3/2016 |
| EP | 1414195 A2 | 4/2004 |
| EP | 2745477 B1 | 4/2016 |
| WO | 2008066257 A1 | 6/2008 |

OTHER PUBLICATIONS

Zhang Yan ling et al. A Minimum Transmission Power AM?OFDM System to Realize Unequal Error Protection, Acta Electronica Sinica, vol. 36 ? No. 7, Jul. 2008,total 6 pages. With English abstract.

Zhang Lei et al. Multimedia transmission of wireless Mesh network based on cross-layer design, Guangdong Communication Technology, Aug. 2009, total 7 pages. With English abstract.

* cited by examiner

METHOD AND APPARATUS FOR TRANSMISSION OF SUBSTREAMS OF VIDEO DATA OF DIFFERENT IMPORTANCE USING DIFFERENT BEARERS

CROSS-REFERENCE TO RELATED APPLICATIONS

This application is a continuation of International Application No. PCT/CN2016/081174, filed on May 5, 2016, the disclosure of which is hereby incorporated by reference in its entirety.

TECHNICAL FIELD

The present application pertains to the field of communications technologies, and in particular, to a video service transmission method and apparatus.

BACKGROUND

With rapid development of the mobile communications and Internet industries, video services are becoming mainstream multimedia services. Video services are transmitted and stored on a network in a form of video files. Because uncompressed original video files have a very large data amount, and transmission and storage require high transmission bandwidths and a large quantity of storage space resources, uncompressed original video files are not suitable for transmission and storage on the network. To facilitate transmission and storage of video files on the network, the industry has introduced a video compression coding method.

H.264 is a high-compression-rate digital video codec standard proposed by the Joint Video Team jointly formed by the Video Coding Experts Group of the International Telecommunication Union-Telecommunication Standardization Sector (ITU-T) and the Moving Picture Experts Group (MPEG) of the International Organization for Standardization/International Electrotechnical Commission (ISO/IEC).

However, in a prior video transmission scheme, there exists a problem that may occur where better quality of service (QoS) cannot be provided for data of high importance during a video service transmission process, especially with constrained transmission resources. As a result, reliable transmission of the data of high importance cannot be ensured with priority.

SUMMARY

Embodiments of the present invention provide a video service transmission method and apparatus, where data in a video data frame can be split into at least two substreams based on a mapping relationship between data importance and a substream, and data of the at least two substreams is mapped, based on port numbers corresponding to the at least two substreams, to bearers corresponding to the at least two substreams, for transmission. Because a network can use different processing methods for data on different bearers, reliable transmission of video data frames of high importance can be ensured with priority by using the video service transmission method and apparatus provided in the embodiments of the present invention, so as to improve service experience of video users in a scenario of constrained transmission resources.

According to a first aspect, an embodiment of the present invention provides a video service transmission method, including: determining importance of data in a video data frame; splitting the data in the video data frame into at least two substreams based on a mapping relationship between data importance and a substream; and mapping, based on port numbers corresponding to the at least two substreams, data of the at least two substreams to bearers corresponding to the at least two substreams, for transmission. Optionally, the data of the substream that is mapped to the bearer may be transmitted by using a secure transfer protocol.

In a possible embodiment, the determining importance of data in a video data frame includes: determining importance of the video data frame, or determining importance of a network abstract layer unit NALU in the video data frame.

In a possible embodiment, the importance of the video data frame may be determined in the following manner: first obtaining a frame type of the video data frame, and then determining the importance of the video data frame based on a mapping relationship between a frame type and frame importance. Specifically, the frame type of the video data frame can be obtained by using information in a frame header of the video data frame.

In a possible embodiment, the importance of the NALU in video data frame may be determined in the following manner: obtaining a NALU type of the NALU in the video data frame, and determining the importance of the NALU based on a mapping relationship between a NALU type and NALU importance. Specifically, the NALU type of the NALU in the video data frame can be obtained by using header information of the NALU in the video data frame.

In a possible embodiment, the data is split, in a granularity of a video data frame, into the at least two substreams based on a mapping relationship between video data frame importance and a substream.

In a possible embodiment, the data is split, in a granularity of a NALU, into the at least two substreams based on a mapping relationship between importance of a NALU in a video data frame and a substream.

In a possible embodiment, data of high importance is mapped to a substream that performs transmission by using a bearer that can meet a QoS requirement of the data, so as to meet the QoS requirement of the data. When the data of high importance is transmitted along with data of low importance on a network, because the data of high importance and the data of low importance are transmitted on different bearers, the network can use different processing methods for data of different importance, so as to ensure reliable transmission of the data of high importance with priority.

In a possible embodiment, a media sub-component description corresponding to the substream is determined based on a stream number of the substream; a transmit-end port number in the media sub-component description can be further determined; the bearer corresponding to the substream can be further determined based on the transmit-end port number; and the data of the substream is mapped to the bearer corresponding to the substream, for transmission.

In a possible embodiment, bearers corresponding to different substreams may all be transmitted by using the Transmission Control Protocol (TCP), or may all be transmitted by using the User Datagram Protocol (UDP), or some of the bearers are transmitted by using the TCP and the rest of the bearers are transmitted by using the UDP. The TCP is a reliable transmission mechanism and may be used for bearing video data of high importance. The UDP is an unreliable transmission mechanism and may be used for bearing video data of low importance.

In a possible embodiment, after the data is split in a granularity of a video data frame, header information of a video data frame in the substream may further include a before-splitting DSN of the video data frame in addition to a substream data sequence number (DSN) of the video data frame in the post-splitting substream.

In a possible embodiment, an existing flexible macroblock ordering (FMO) coding method is extended, and a new mapping pattern from a macroblock to a slice group is defined. The mapping pattern may define which types of macroblocks are mapped to a same slice group, so that macroblocks of high importance can be mapped to a same slice group. NALUs of a same type are generated after data in the same slice group is encoded. Therefore, the NALUs of the same type may be further mapped to a bearer corresponding to a same substream, for transmission. In this way, an objective of implementing reliable transmission for macroblocks of high importance with priority is achieved.

In a possible embodiment, after the data is split in a granularity of a NALU, header information of a substream data frame may further include an original DSN that is corresponding to each NALU in the substream data frame in addition to a post-splitting substream DSN.

In a possible embodiment, the video service transmission apparatus may support at least one splitting scheme. Further, in a scenario in which the video service transmission apparatus supports more than one splitting scheme, the video service transmission apparatus may further determine specifically which splitting scheme to be used based on a configuration parameter related to the splitting scheme.

According to a second aspect, an embodiment of the present invention provides another video service transmission method, including: receiving, by a video service receiving apparatus from at least two bearers, data of at least two substreams, where the bearers are corresponding to the substreams based on a receive-end port number, and the data of the substreams is obtained by splitting video data based on a mapping relationship between importance of data in a video data frame and a substream; and then performing, by the video service receiving apparatus, aggregation processing on the data that is from the at least two substreams. The method is used to receive the video data sent by the video service transmission apparatus in the video service transmission method in the first aspect, and therefore can implement the beneficial effects of the video service transmission method in the first aspect.

In a possible embodiment, different data splitting manners are used for the video service transmission apparatus in the first aspect, and the video service receiving apparatus performs different aggregation processing for the received data of the substreams. If the video service transmission apparatus performs splitting at a video data frame level, the video service receiving apparatus can aggregate the data of the substreams, and sort the aggregated data based on a before-splitting original DSN. If the video service transmission apparatus performs splitting at a NALU level, the video service receiving apparatus first aggregates the data of the substreams, based on a before-splitting original DSN that is corresponding to a NALU in the data, combines the NALU to restore a before-splitting video data frame, and then sorts the generated video data frame based on the original DSN.

In a possible embodiment, the video service receiving apparatus can support receiving processing corresponding to at least one splitting scheme. The video service receiving apparatus determines a splitting scheme used for video service transmission before performing aggregation processing. Specifically, the video service receiving apparatus may determine the splitting scheme used for video service transmission by using a splitting scheme-related information element, where the splitting scheme-related information element may be included in a signaling message or may be included in the video data and sent by the video service transmission apparatus to the video service receiving apparatus. Alternatively, the video service receiving apparatus may determine the splitting scheme used for video service transmission by obtaining a characteristic of the video data frame. For a scenario in which only one splitting scheme is supported, the splitting scheme supported by the video service receiving apparatus and the video service transmission apparatus may be specified.

According to a third aspect, an embodiment of the present invention provides a video service transmission apparatus. The apparatus implements functions of the video service transmission apparatus in the video service transmission method in the first aspect, and therefore can implement the beneficial effects of the video service transmission method in the first aspect. The functions may be implemented by hardware, or may be implemented by hardware executing corresponding software. The hardware or software includes at least one module that corresponds to the foregoing functions.

In a possible embodiment, the video service transmission apparatus includes a processor and a transceiver. The processor is configured to determine importance of data in a video data frame and split the data in the video data frame into at least two substreams based on a mapping relationship between data importance and a substream, and is further configured to map, based on port numbers corresponding to the at least two substreams, data of the at least two substreams to bearers corresponding to the at least two substreams. The transceiver is configured to transmit data on the bearer.

Specifically, for a manner and a process of determining, by the processor, importance of data in a video data frame, refer to related descriptions in the method embodiment in the first aspect. For a manner and a process of splitting, by the processor, the data in the video data frame into at least two substreams based on a mapping relationship between data importance and a substream, refer to related descriptions in the method embodiment in the first aspect.

Specifically, for a manner and a process of mapping, by the processor based on port numbers corresponding to the at least two substreams, data of the at least two substreams to bearers corresponding to the at least two substreams, refer to related descriptions in the method embodiment in the first aspect. The processor may further perform encryption processing, by using a secure transfer protocol, on the data of the substream that is mapped to the bearer.

In a possible embodiment, the video service transmission apparatus further includes a video encoder. The video encoder is configured to encode a video to obtain a video data frame, and send the encoded video data frame to the processor for processing.

In a possible embodiment, the video service transmission apparatus may further include a memory. The memory is configured to store related program code and data in the video encoder, the processor, and the transceiver. The data stored in the memory may include at least one of a mapping relationship between a frame type and frame importance, a mapping relationship between a NALU type and NALU importance, a mapping relationship from a macroblock to a slice group, and a mapping relationship between data importance and a substream.

In a possible embodiment, the video service transmission apparatus is any one of a video server, a video conference terminal, or a video conference management server.

According to a fourth aspect, an embodiment of the present invention provides another video service transmission apparatus. The apparatus performs a function of the video service transmission apparatus in the video service transmission method in the first aspect, and therefore can implement the beneficial effects of the video service transmission method in the first aspect. The functions may be implemented by hardware, or may be implemented by hardware executing corresponding software. The hardware or software includes at least one module that corresponds to the foregoing functions.

In a possible embodiment, the video service transmission apparatus includes a data splitting unit, a bearer mapping unit, and a communications unit. The data splitting unit is configured to determine importance of data in a video data frame, and is configured to split the data in the video data frame into at least two substreams based on a mapping relationship between data importance and a substream. The bearer mapping unit is configured to map, based on port numbers corresponding to the at least two substreams, data of the at least two substreams to bearers corresponding to the at least two substream. The communications unit is configured to transmit data on the bearer.

Specifically, for a manner and a process of determining, by the data splitting unit, importance of data in a video data frame, refer to related descriptions in the method embodiment in the first aspect. For a manner and a process of splitting, by the data splitting unit, the data in the video data frame into at least two substreams based on a mapping relationship between data importance and a substream, refer to related descriptions in the method embodiment in the first aspect.

Specifically, for a manner and a process of mapping, by the bearer mapping unit, data of the substream to a bearer corresponding to the substream, refer to related descriptions in the method embodiment in the first aspect. The bearer mapping unit may further perform encryption processing, by using a secure transfer protocol, on the data of the substream that is mapped to the bearer.

In a possible embodiment, the video service transmission apparatus further includes a video encoding unit, configured to encode a video to obtain a video data frame, and send the encoded video data frame to the data splitting unit for splitting processing on the data.

In a possible embodiment, the video service transmission apparatus may further include a flexible macroblock ordering unit, configured to implement mapping from a macroblock to a slice group in a video picture, and send slice group data of the video picture to the video encoding unit.

In a possible embodiment, for a data splitting scheme at a NALU level, there may be flexible mapping from a macroblock to a NALU. The flexible macroblock ordering unit may extend an existing FMO encoding method and define a new mapping pattern from a macroblock to a slice group. The mapping pattern may define which types of macroblocks are mapped to a same slice group.

In a possible embodiment, the video service transmission apparatus may further include a storage unit. The storage unit is configured to store related program code and data in the flexible macroblock ordering unit, the video encoding unit, the data splitting unit, the bearer mapping unit, and the communications unit. The data stored in the storage unit may include at least one of a mapping relationship between a frame type and frame importance, a mapping relationship between a NALU type and NALU importance, a mapping relationship from a macroblock to a slice group, and a mapping relationship between data importance and a substream.

In a possible embodiment, the video service transmission apparatus is any one of a video server, a video conference terminal, or a video conference management server.

According to a fifth aspect, an embodiment of the present invention provides a video service receiving apparatus. The apparatus implements functions of the video service receiving apparatus in the video service transmission method in the second aspect, and therefore can implement the beneficial effects of the video service transmission method in the second aspect. The functions may be implemented by hardware, or may be implemented by hardware executing corresponding software. The hardware or software includes at least one module that corresponds to the foregoing functions.

In a possible embodiment, the video service receiving apparatus includes a processor and a transceiver. The transceiver is configured to receive, from at least two bearers, data of at least two substreams, where the bearers are corresponding to the substreams based on a receive-end port number, and the data of the substreams is obtained by splitting video data based on a mapping relationship between importance of data in a video data frame and a substream. The processor is configured to perform aggregation processing on the data that is from the at least two substreams.

In a possible embodiment, the video service receiving apparatus further includes a video decoder, configured to decode the data after the aggregation processing, to obtain a before-encoding video.

Specifically, for a manner and a process of performing, by the processor, aggregation processing on the data, refer to related descriptions in the method embodiment in the second aspect.

In a possible embodiment, the video service receiving apparatus is any one of a terminal, a video conference terminal, or a video conference management server.

According to a sixth aspect, an embodiment of the present invention provides another video service receiving apparatus. The apparatus performs a function of the video service receiving apparatus in the video service transmission method in the second aspect, and therefore can implement the beneficial effects of the video service transmission method in the second aspect. The functions may be implemented by hardware, or may be implemented by hardware executing corresponding software. The hardware or software includes at least one module that corresponds to the foregoing functions.

In a possible embodiment, the video service receiving apparatus includes a data aggregation unit and a communications unit. The communications unit is configured to receive, from at least two bearers, data of at least two substreams, where the bearers are corresponding to the substreams based on a receive-end port number, and the data of the substreams is obtained by splitting video data based on a mapping relationship between importance of data in a video data frame and a substream. The data aggregation unit is configured to perform aggregation processing on the data that is from the at least two substreams.

In a possible embodiment, the video service receiving apparatus further includes a video decoding unit, configured to decode the data after the aggregation processing, to obtain a before-encoding video.

Specifically, for a manner and a process of performing, by the data aggregation unit, aggregation processing on the data, refer to related descriptions in the method embodiment in the second aspect.

In a possible embodiment, the video service receiving apparatus is any one of a terminal, a video conference terminal, or a video conference management server.

For the embodiments from the first aspect to the sixth aspect, for radio bearers that have different quality of service (QoS) requirements, a radio access network (RAN) has a plurality of policies to ensure reliable transmission of data on a radio bearer of high importance with priority. Specific possible embodiments are as follows.

In a possible embodiment, the RAN may use different network configuration parameters. For example, different radio link control (RLC) modes are used. For data on a radio bearer of high importance, an RLC acknowledged mode (AM) is used; for data on a radio bearer of low importance, an RLC unacknowledged mode (UM) is used. Alternatively, different quantities of retransmissions of a hybrid automatic repeat request (HARQ) are configured. For data on a radio bearer of high importance, a relatively large quantity of HARQ retransmissions is configured, for example, 6, so as to ensure reliable transmission of the data; for data on a radio bearer of low importance, a relatively small quantity of HARQ retransmissions is configured, for example, 2. In this way, in a scenario of constrained resources, reliable transmission of data of high importance may be ensured with priority.

In a possible embodiment, the RAN may alternatively use different scheduling policies for different radio bearers, and allocate radio resources to the data on the radio bearer of high importance with priority. In this way, in a scenario of constrained resources, reliable transmission of data of high importance may be ensured with priority.

In a possible embodiment, the RAN may alternatively map different radio bearers to different carriers for bearing. For example, in a carrier aggregation scenario, because a path loss of a low-frequency carrier is less than a path loss of a high-frequency carrier, a radio bearer of high importance may be mapped to the low-frequency carrier for transmission, and a radio bearer of low importance may be mapped to the high-frequency carrier for transmission.

In a possible embodiment, the RAN may alternatively map different radio bearers to different types of spectrums for bearing. A licensed spectrum is a spectrum resource that may be controlled by an operator, and interference coordination and control can be performed effectively. An unlicensed spectrum is beyond control of the operator, and interferences and conflicts of which are uncontrollable. For data transmission on the unlicensed spectrum, a transmission bandwidth and delay cannot be ensured. However, due to low costs, using the unlicensed spectrum is an effective supplement to data transmission by operators. Therefore, the radio bearer of high importance may be mapped to the licensed spectrum for transmission, and the radio bearer of low importance may be mapped to the unlicensed spectrum for transmission.

BRIEF DESCRIPTION OF DRAWINGS

To describe the technical solutions in the embodiments of the present invention more clearly, the following briefly describes the accompanying drawings required for describing the embodiments of the present invention. Apparently, the accompanying drawings in the following description show merely some embodiments of the present invention, and a person of ordinary skill in the art may derive other drawings from these accompanying drawings without creative efforts.

DESCRIPTION OF EMBODIMENTS

Embodiments of the present invention describe a video service transmission method and apparatus, where data is split based on importance of data in a video data frame, so as to implement that different processing methods are used for data of different importance, and reliable transmission of data of high importance is ensured with priority.

Figure 1:
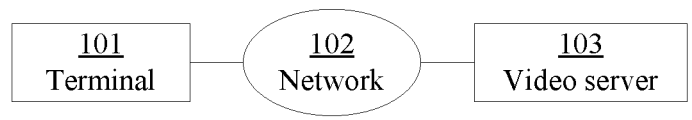
FIG. 1 is a schematic diagram of a possible application scenario according to an embodiment of the present invention.

FIG. 1 shows a possible application scenario according to an embodiment of the present invention. A terminal 101 accesses a video server 103 through a network 102, to obtain a video service, such as a video broadcast or a video-on-demand service. The network 102 herein may include a mobile broadband access network, such as a Long Term Evolution (LTE) or a Universal Mobile Telecommunications System (UMTS) mobile broadband access network, or may include a fixed broadband access network, such as an Asymmetric Digital Subscriber Line (ADSL) or a Fiber To The Home (FTTH) fixed broadband access network. In this scenario, the video server 103 may be considered as a video service transmission apparatus, and the terminal 101 may be considered as a video service receiving apparatus.

In addition, this embodiment of the present invention may be alternatively applied to a video conference management system, where at least two video conference terminals perform video communications by using the video conference management system. Correspondingly, the following cases may exist for video service data transmission. Video data is uploaded from a video conference terminal to a video conference management server. In this case, the video conference terminal may be considered as a video service transmission apparatus, and the video conference management server may be considered as a video service receiving apparatus. The video conference management server synthesizes the video data that is received and that is from the at least two video conference terminals, and pushes the synthesized video to corresponding video conference terminals. In this case, the video conference management server may be considered as a video service transmission apparatus, and the video conference terminal may be considered as a video service receiving apparatus.

The terminal in this embodiment of the present invention may be alternatively referred to as user equipment, and may be a wireless terminal or a wired terminal. A wireless terminal may be a device providing voice and/or data connectivity to a user, or a handheld device having a wireless connection function, or another processing device connected to a wireless modem. The wireless terminal may communicate with at least one core network by using a radio access network. The wireless terminal may be a mobile terminal, for example, a mobile phone (or referred to as a "cellular" phone), or a computer with a mobile terminal. For example, the wireless terminal may be a portable, pocket-sized, handheld, computer built-in, or in-vehicle mobile apparatus, which exchanges voice and/or data with a radio access network. The wireless terminal may also be referred to as a subscriber unit, a subscriber station, a mobile station, a remote station, an access point, a remote terminal, an access terminal, a user terminal, a user agent, or user equipment. The wired terminal may refer to a device that provides a user with voice and/or data connectivity in a wired manner, for example, a wired video telephone or a computer having functions of a video communications terminal.

Figure 2:
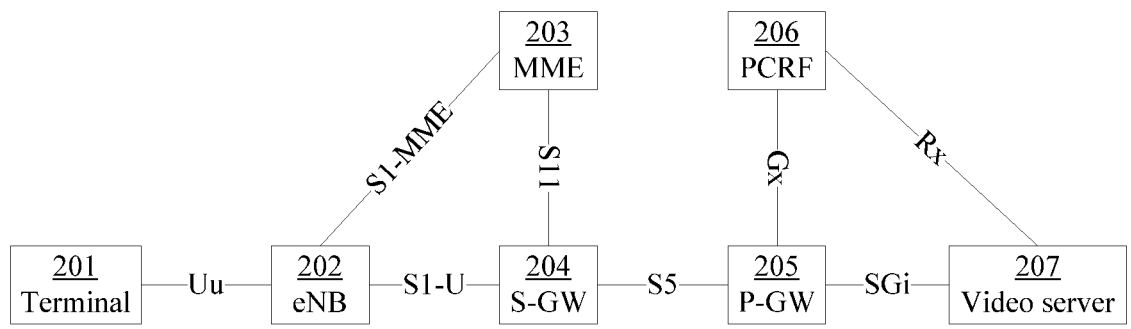
FIG. 2 is a schematic diagram of a possible system network architecture according to an embodiment of the present invention.

As shown in FIG. 2, a schematic diagram of a possible system network architecture according to an embodiment of the present invention is provided, including mainly a terminal 201, an E-UTRAN NodeB (eNB) 202, a mobility management entity (MME) 203, a serving gateway (S-GW) 204, a packet data network gateway (P-GW) 205, a policy and charging rules function (PCRF) 206, and a video server 207. For detailed descriptions of functions, interfaces, and signaling procedures of the foregoing network elements, refer to a 3rd Generation Partnership Project (3GPP) protocol, for example, the TS 23.401 v13.4.0. As shown in FIG. 2, the video server 207 performs message exchange with the PCRF 206 by using an Rx interface, the video server 207 performs message exchange with the P-GW 205 by using an SGi interface, the P-GW 205 performs message exchange with the S-GW 204 by using an S5 interface, the P-GW 205 performs message exchange with the PCRF 206 by using a Gx interface, the S-GW 204 performs message exchange with the MME 203 by using an S11 interface, the S-GW 204 performs message exchange with the eNB 202 by using an S1-U interface, the MME 203 performs message exchange with the eNB 202 by using an S1-MME interface, and the eNB 202 performs message exchange with the terminal 201 by using a Uu interface.

A network architecture and an application scenario that are described in the embodiments of the present invention are used to describe the technical solutions in the embodiments of the present invention more clearly, but do not limit the technical solutions provided in the embodiments of the present invention. A person of ordinary skill in the art may know that the technical solutions provided in the embodiments of the present invention are also applicable to similar technical problems as the network architecture evolves and a new application scenario appears.

Figure 3:
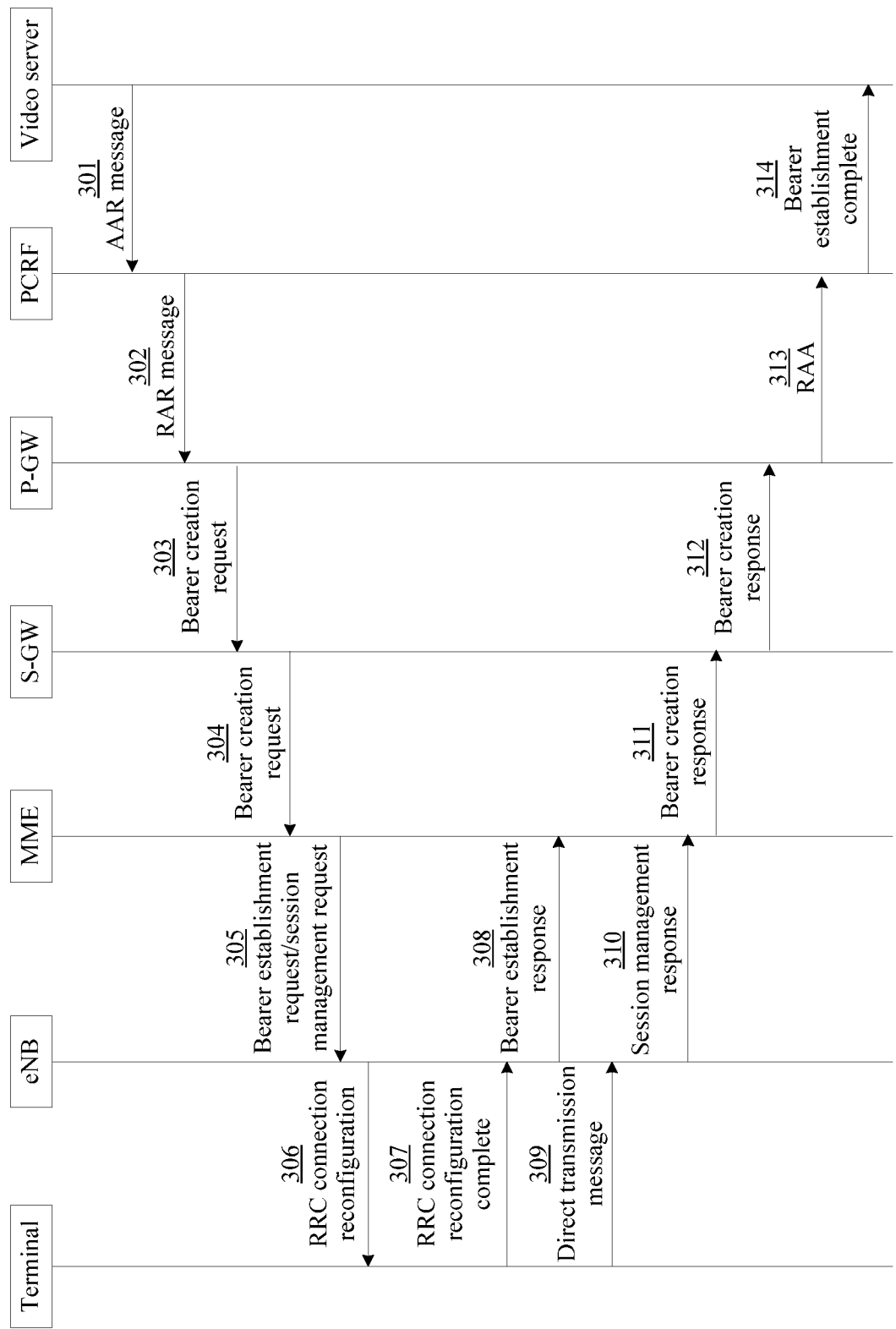
FIG. 3 is a schematic diagram of a possible process of establishing a video service bearer according to an embodiment of the present invention.

It can be understood that transmission of a video service is based on a bearer. FIG. 3 is a schematic diagram of a possible process of establishing a video service bearer according to an embodiment of the present invention.

301: After receiving a service request message sent by a terminal, a video server sends an authentication authorization request (AAR) message to a PCRF through an Rx interface.

The service request message may be a Hypertext Transfer Protocol (HTTP) GET request message, or may be another similar service request message.

The AAR message includes a user IP address, an application identifier, media description information, and the like. The media description information includes a media component number, a media type, description information of at least one media sub-component, and the like. The media sub-component description includes a stream number of the media sub-component, a port number corresponding to the stream, a media stream description, a media stream status, and an uplink/downlink bandwidth application of the media sub-component. The port number corresponding to the stream includes a transmit-end port number and a receive-end port number.

To facilitate implementation, by a network, different transmission quality assurance for data of different importance, and to ensure reliable transmission of data of high importance with priority, the video server may split data in a video data frame into at least two substreams based on a mapping relationship between data importance and a substream. To establish a bearer corresponding to the substream, the video server provides, in the AAR message, a media sub-component description for each substream. In this case, data streams of one video are split into a plurality of bearers for transmission. A data stream transmitted on each bearer may be referred to as a video data substream, a substream for short.

The mapping relationship between data importance and a substream herein is also a mapping relationship between data importance and a bearer. To transmit data of different importance, different bearers may be established, and each bearer has a different quality of service (QoS) attribute. For example, different bearers have different uplink/downlink bandwidth applications. For example, to transmit three types of data whose data importance is respectively high, medium, and low, the mapping relationship between data importance and a substream may be established according to the following method. Data of high importance is mapped to a substream that performs transmission on a bearer that can meet a QoS requirement of the data. For example, the data of high importance requires a downlink transmission bandwidth of 10 Mbps. For this, a bearer B1 is defined, where a downlink bandwidth application of the bearer is 10 Mbps, data of a substream F1 is transmitted on the bearer, and a stream number of the substream is 1. The data of medium importance requires a downlink transmission bandwidth of 5 Mbps. For this, a transmission bearer B2 is defined, where a downlink bandwidth application of the bearer is 5 Mbps, data of a substream F2 is transmitted on the bearer, and a stream number of the substream is 2. The data of low importance requires a downlink transmission bandwidth of 1 Mbps. For this, a transmission bearer B3 is defined, where a downlink bandwidth application of the bearer is 1 Mbps, data of a substream F3 is transmitted on the bearer, and a stream number of the substream is 3.

302: After receiving the AAA message, the PCRF matches, based on an attribute-value pair (AVP) in the AAR message, a user-subscribed service and a QoS parameter, and then sends a re-authentication request (RAR) message to a P-GW to apply for establishing at least two dedicated bearers.

The RAR message includes a policy and charging control (PCC) rule that is delivered by the PCRF to the P-GW, and the PCC rule includes QoS parameters of the data stream and values of the QoS parameters. Therefore, the PCRF allocates a different PCC rule to each substream, and sends the PCC rule to the P-GW by using the RAR message. The QoS parameters herein may include a QoS class identifier (QCI), an allocation and retention priority (ARP), and an allowed uplink/downlink bit rate.

303: The P-GW parses the PCC rule carried in the RAR message and sends, based on the QoS parameters and the values of the QoS parameters in the PCC rule, at least one bearer establishment request message to an S-GW, to initiate establishing at least two dedicated bearers.

The bearer establishment request message includes the QoS parameters. One bearer establishment request message may be used to establish one dedicated bearer, or establish a plurality of bearers simultaneously.

304: After receiving the bearer establishment request message, the S-GW sends the bearer establishment request message to an MME, to initiate establishing at least two dedicated bearers. The message includes the QoS parameters and the values of the QoS parameters.

305: After receiving the bearer establishment request message, the MME allocates an unused evolved packet system (EPS) bearer identifier to each bearer establishment request message, and then sends a bearer establishment request message to an eNB, to initiate establishing at least two dedicated bearers. The bearer establishment request message carries the EPS bearer identifier and a session management request.

The bearer establishment request message received by the MME may include at least one bearer establishment request, and the bearer establishment request message sent by the MME to the eNB may include at least one bearer establishment request, and one EPS bearer identifier is corresponding to one EPS bearer. After allocating the EPS bearer identifier, the MME establishes a session management request, where the request includes QoS parameters and values of the QoS parameters of the EPS bearer. Based on the session management request, the MME sends a bearer establishment request to the eNB.

306: After receiving the bearer establishment request, the eNB maps the QoS parameters of the EPS bearer to QoS parameters of a radio bearer, and sends a radio resource control (RRC) connection reconfiguration message to the terminal, to initiate establishing at least two dedicated bearers. The message includes the session management request and the QoS parameters of the radio bearer.

307: The terminal sends an RRC connection reconfiguration complete message to the eNB, to confirm that the radio bearer is activated.

308: The eNB sends a bearer establishment response to the MME confirm that the bearer is activated.

309: A non-access stratum (NAS) of the terminal establishes a session management response including the EPS bearer identifier. The session management response is borne in a direct transmission message and sent to the eNB.

310: The eNB sends a session management response message to the MME.

311: After receiving the bearer establishment response message and the session management response message that are fed back by the eNB, the MME sends a bearer establishment response to the S-GW, to confirm to the S-GW that the bearer is activated.

312: The S-GW sends a bearer establishment response message to the P-GW, to confirm to the P-GW that the bearer is activated.

313: After receiving the bearer establishment response, the P-GW sends a re-authentication answer (RAA) message to the PCRF, to indicate that the bearer is established successfully.

314: After receiving the RAA message, the PCRF informs the video server that bearer establishment is complete.

After the foregoing steps, at least two end-to-end bearers are established between the video server and the terminal, to bear data transmission of at least two video substreams. The bearer is identified at the transmit end by using the transmit-end port number of the substream in the media sub-component description in 301, and is identified at the receive end by using the receive-end port number of the substream in the media sub-component description in 301. The data substream transmitted on the bearer is identified by using the stream number in the media sub-component description in 301. Different bearers may have different values of QoS parameters, so as to implement different transmission quality assurance for data of the substream transmitted on the bearer, and further to ensure reliable transmission of data of high importance with priority.

In the foregoing procedure, at least two bearers can be established at a time. It may be understood that alternatively one bearer can be established at a time. A procedure of establishing one bearer is similar to procedures 301 to 314. Further, at least two bearers may be established through at least two procedures.

The process of establishing a video service bearer described in FIG. 3 is based on the application scenario shown in FIG. 1. It may be understood that this embodiment of the present invention may be alternatively applied to another application scenario, where there is a similar corresponding process of establishing a video service bearer, for example, an application scenario in which the above-mentioned at least two video conference terminals perform video communications by using a video conference management system. The corresponding process of establishing a video service bearer can be understood by and well known to a person skilled in the art. Details are not described herein again.

The process of establishing a video service bearer described in FIG. 3 is based on the system network architecture shown in FIG. 2. It may be understood that this embodiment of the present invention may alternatively use another system network architecture, and there is a similar corresponding process of establishing a video service bearer.

For ease of description and understanding, the foregoing application scenario, the network architecture, and the bearer establishment process are described by using a specific video service transmission apparatus and a video service receiving apparatus. For example, the video service transmission apparatus may be a video server, a video conference terminal, or a video conference management server, and the video service receiving apparatus may be a terminal, a video conference terminal, or a video conference management server. The following directly uses the two terms "video service transmission apparatus" and "video service receiving apparatus" to describe a video service transmission method.

As mentioned before, the video service transmission apparatus encodes a video service to obtain a video data frame. A method for video encoding may be H.264, or may be another encoding method. The following uses the H.264 encoding method as an example for description.

Figure 4:
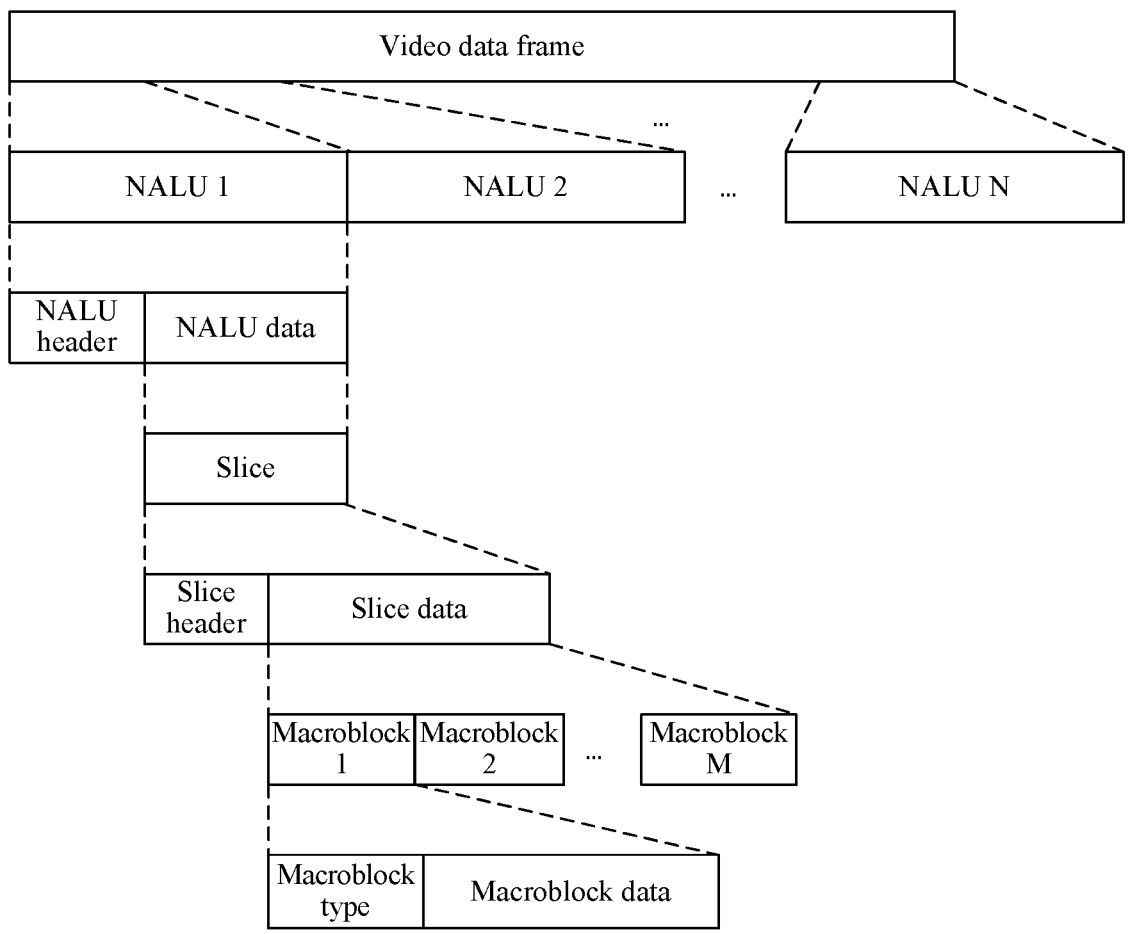
FIG. 4 is a schematic diagram of a possible video data frame format according to an embodiment of the present invention.

A video includes a plurality of pictures. One picture may be divided into at least one slice for encoding, to generate a video data frame. FIG. 4 gives a schematic diagram of a possible video data frame format according to an embodiment of the present invention. As shown in FIG. 4, one slice includes at least one macroblock, where a macroblock is a basic unit of video encoding processing. Data obtained after encoding of one slice is encapsulated into at least one network abstraction layer unit (NALU), where a NALU is a basic unit of video service transmission.

Because different predictive coding manners, for example, intra-frame prediction and inter-frame prediction, may be used for macroblocks, different macroblocks may have different sizes and importance. In H.264, four types of macroblocks are defined: an I-macroblock, an SI-macroblock (a special intra-frame coding macroblock), a P-macroblock, and a B-macroblock, where the I-macroblock and the SI-macroblock use intra-frame prediction, and the P-macroblock and the B-macroblock use inter-frame prediction. Importance of different macroblocks is sequentially: I-macroblock>SI-macroblock>P-macroblock>B-macroblock.

A video data frame obtained after H.264 encoding may be classified into three types based on encoding manners: an intra-frame encoded I-frame, a forward prediction encoded P-frame, and a bi-directional prediction encoded B-frame. The I-frame is encoded by directly performing intra-frame encoding on an original data frame before encoding without reference to information of other original data frames. The I-frame can independently restore a before-encoding data frame by using data of the I-frame. For the P-frame, motion prediction is performed by using a recent I-frame or P-frame as a comparison benchmark, to record a difference between the data frame and the benchmark data frame. Encoding efficiency of the P-frame is relatively high. However, the P-frame can restore a before-encoding data frame only by referring to the benchmark data frame. For the B-frame, bi-directional prediction encoding is performed by using an adjacent previous data frame and a next data frame as references. In the three types of data frames, the I-frame is the most important, followed by the P-frame, and the B-frame at last.

The foregoing classification of macroblocks and video data frames and importance sorting of macroblocks and video data frames are all described based on definitions in the current H.264 video encoding standard. These are merely specific examples of the embodiments of the present invention. It can be understood that the embodiments of the present invention do not impose any limitation on the classification and importance sorting of macroblocks and video data frames.

Figure 5:
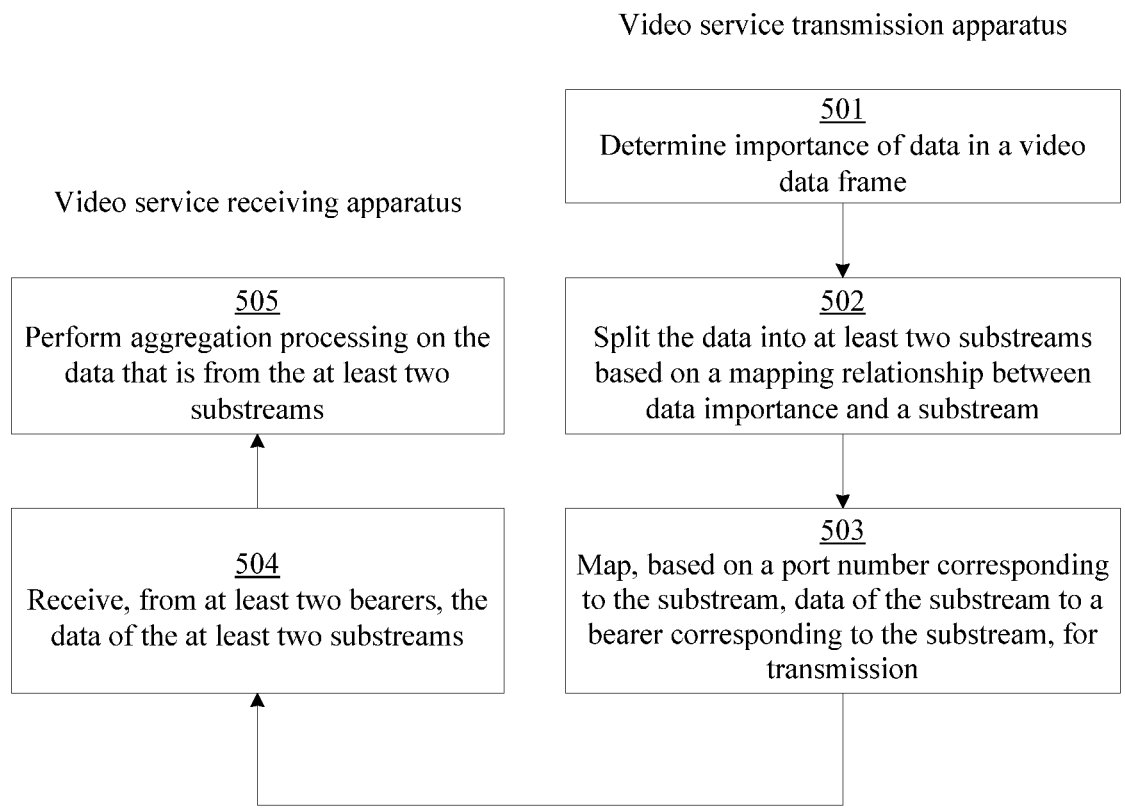
FIG. 5 is a schematic diagram of a possible video service transmission method according to an embodiment of the present invention.

After establishment of a video service bearer is completed, the video service transmission apparatus can send the video service to the video service receiving apparatus on the established bearer. FIG. 5 gives a schematic diagram of a possible video service transmission method according to an embodiment of the present invention.

501: Determine importance of data in a video data frame.

The data in the video data frame herein may refer to the video data frame, or may be a data unit in the video data frame, for example, a NALU.

Specifically, importance of the video data frame may be determined in the following manner: obtaining a frame type of the video data frame, and determining the importance of the video data frame based on a mapping relationship between a frame type and frame importance. Specifically, the frame type of the video data frame can be obtained by using information in a frame header of the video data frame.

Specifically, importance of the NALU in video data frame may be determined in the following manner: obtaining a NALU type of the NALU in the video data frame, and determining the importance of the NALU based on a mapping relationship between a NALU type and NALU importance. Specifically, the NALU type of the NALU in the video data frame can be obtained by using header information of the NALU in the video data frame.

502: The video service transmission apparatus splits the data in the video data frame into at least two substreams based on a mapping relationship between data importance and a substream.

For a description about the mapping relationship between data importance and a substream, refer to related descriptions in the foregoing embodiments.

It can be understood that the mapping relationship between data importance and a substream can be configured differently depending on different video services. For example, video data of a high-definition video service is mapped with three types of importance: high, medium, and low, while video data of a standard-definition video service is mapped with only two types of importance: high and medium. In addition, different mapping relationships can be selected based on different user types. For example, video data of a gold user is mapped with three types of importance: high, medium, and low, while video data of a silver user is mapped with only two types of importance: high and medium.

503: The video service transmission apparatus maps, based on port numbers corresponding to the at least two substreams, data of the at least two substreams to bearers corresponding to the at least two substreams, for transmission.

The port number may be a transmit-end port number.

Optionally, the data of the substream that is mapped to the bearer may be transmitted by using a secure transfer protocol, so as to ensure security and data integrity of the service. The secure sockets layer (SSL) is a secure transfer protocol that is relatively widely applied at present.

Figure 6:
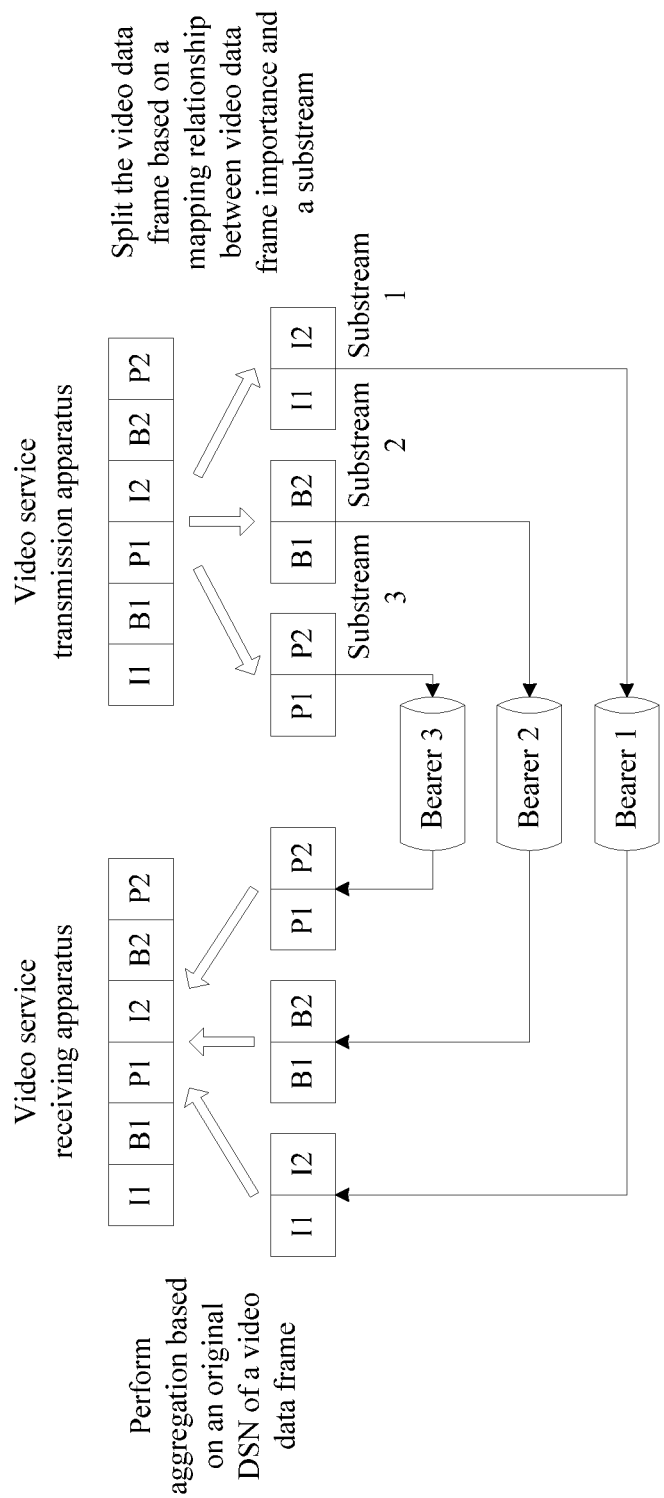
FIG. 6 is a schematic diagram of possible video data splitting transmission at a video data frame level according to an embodiment of the present invention.

As shown in FIG. 6, data of a substream 1 is mapped to a bearer 1 for transmission, data of a substream 2 is mapped to a bearer 2 for transmission, and data of a substream 3 is mapped to a bearer 3 for transmission.

In 301, each substream is corresponding to one bearer, and each bearer is corresponding to one media sub-component description. The media sub-component description includes a stream number, and a transmit-end port number and a receive-end port number of the stream. Therefore, a media sub-component description corresponding to the substream can be determined based on the stream number of the substream. Further, the transmit-end port number in the media sub-component description can be determined. Further, the bearer corresponding to the substream can be determined based on the transmit-end port number, to implement mapping between the substream and the bearer. Then the data of the substream is mapped to the bearer corresponding to the substream, for transmission.

Data in substreams with different QoS requirements is transmitted on different bearers. Therefore, a network can perform respective control over the data in the substreams with different QoS requirements, to ensure reliable transmission of video data of high importance with priority.

Further, bearers corresponding to at least two substreams may all be transmitted by using the Transmission Control Protocol (TCP), or may all be transmitted by using the User Datagram Protocol (UDP), or some of the bearers are transmitted by using the TCP and the rest of the bearers are transmitted by using the UDP. For example, the bearer 1, the bearer 2, and the bearer 3 may all use the TCP for transmission. Alternatively, the bearer 1, the bearer 2, and the bearer 3 may all use the UDP for transmission. Alternatively, the bearer 1 may use the TCP for transmission, and the bearer 2 and the bearer 3 may use the UDP for transmission. The TCP is a reliable transmission mechanism and may be used for bearing video data of high importance. The UDP is an unreliable transmission mechanism and may be used for bearing video data of low importance.

The following further describes the mapping relationship between a frame type and frame importance, and the mapping relationship between a NALU type and NALU importance described in 501.

The mapping relationship between a frame type and frame importance may be one-to-one or many-to-one. A one-to-one mapping relationship means one frame type is corresponding to one type of frame importance, and a many-to-one mapping relationship means at least two frame types are corresponding to one same type of frame importance. For example, frame importance may be defined as three levels: high, medium, and low. Correspondingly, the I-frame may be mapped to the high-importance level, the P-frame may be mapped to the medium-importance level, and the B-frame may be mapped to the low-importance level. Alternatively, the I-frame may be mapped to the high-importance level, and both the P-frame and the B-frame may be mapped to the medium-importance level.

It can be understood that the mapping relationship between a frame type and frame importance may be predetermined and stored in the video service transmission apparatus. Further, the mapping relationship between a frame type and frame importance may be only one or more than one. In a scenario of more than one mapping relationships between a frame type and frame importance, the video service transmission apparatus can further determine, based on configuration parameters related to the mapping relationship, specifically which mapping relationship to be used.

In the H.264 standard, when a value of the NALU type is 3, it indicates that a data type in the NALU is a coding slice data segmentation block B, including mainly information of the I-macroblock and the SI-macroblock; when a value of the NALU type is 4, it indicates that a data type in the NALU is a coding slice data segmentation block C, including mainly information of the P-macroblock and the B-macroblock.

To define a data type in the NALU in a more flexible manner, the value of the NALU type may be extended. For example, when the value of the NALU type is defined to be 24, it indicates that the NALU includes mainly information of the I-macroblock; when the value of the NALU type is defined to be 25, it indicates that the NALU includes mainly information of the SI-macroblock; when the value of the NALU type is defined to be 26, it indicates that the NALU includes mainly information of the P-macroblock; and when the value of the NALU type is defined to be 27, it indicates that the NALU includes mainly information of the B-macroblock.

The mapping relationship between a NALU type and NALU importance may be one-to-one, or many-to-one. A one-to-one mapping relationship means one NALU type is corresponding to one type of NALU importance, and a many-to-one mapping relationship means at least two NALU types are corresponding to one same type of NALU importance. For example, NALU importance may be defined as three levels: high, medium, and low. Correspondingly, a NALU with a type 24 may be mapped to the high-importance level, a NALU with a type 25 may be mapped to the medium-importance level, and NALUs with types 4, 26, and 27 may be mapped to the low-importance level. Alternatively, NALUs with types 3, 24, and 25 may be mapped to the high-importance level, and NALUs with types 4, 26, and 27 may be mapped to the medium-importance level. The foregoing describes the mapping relationship between a NALU type and NALU importance by using extended values of NALU types. It can be understood that the mapping relationship between a NALU type and NALU importance may alternatively be based on an existing value of a NALU type. Detailed examples are not provided herein again.

It can be understood that the mapping relationship between a NALU type and NALU importance may be predetermined and stored in the video service transmission apparatus. Further, the mapping relationship between a NALU type and NALU importance may be only one or more than one. In a scenario of more than one mapping relationships between a NALU type and NALU importance, the video service transmission apparatus can further determine, based on configuration parameters related to the mapping relationship, specifically which mapping relationship to be used.

The foregoing extension of values of NALU types may be implemented in a scenario of flexible mapping from a macroblock to a NALU. The flexible mapping may be obtained through extension by using an existing flexible macroblock ordering (FMO) encoding method. FMO is a function provided in the H.264 standard to improve bit error resistance performance of video service transmission. The function supports mapping a macroblock to different slice groups by configuring different mapping patterns. The function is completed before video encoding. A slice group includes at least one slice in a same picture. A slice is an independent predictive coding unit, and a macroblock of a slice cannot be predicted with reference to a macroblock of another slice. When a slice has a problem another slice can still be independently decoded. This prevents an error from spreading.

In the H.264 standard, seven patterns of mapping a macroblock to a slice group are defined, and are sequentially an interleaved pattern, a dispersed pattern, a foreground and background pattern, a box-out pattern, a raster scan pattern, a wipe pattern, and an explicit pattern. The first six patterns are specified in the standard, and the seventh pattern is user-defined. For detailed descriptions about the FMO, refer to <H.264 and MPEG-4 video compression>.

As shown in FIG. 4, one NALU is corresponding to one slice, and data of one slice likely includes macroblocks of different types. Extension of the existing FMO encoding method may be implemented in the following manner:

A new pattern of mapping a macroblock to a slice group is defined, where the mapping pattern can define which types of macroblocks are mapped to a same slice group. For example, the I-macroblock may be mapped to a slice group 1, the SI-macroblock may be mapped to a slice group 2, the P-macroblock may be mapped to a slice group 3, and the B-macroblock may be mapped to a slice group 4. Alternatively, both the I-macroblock and the SI-macroblock are mapped to the slice group 1, the P-macroblock is mapped to the slice group 2, and the B-macroblock is mapped to the slice group 3. Alternatively, both the I-macroblock and the SI-macroblock are mapped to the slice group 1, and both the P-macroblock and the B-macroblock are mapped to the slice group 2. The video service transmission apparatus can determine, based on configuration parameters related to mapping from a macroblock to a slice group, specifically which types of macroblocks are mapped to a same slice group.

For the splitting, based on a mapping relationship between data importance and a substream, data into at least two substreams in 502, there may be different splitting schemes. For example, the splitting schemes may be specifically:

1. Splitting at a Video Data Frame Level:

The splitting at a video data frame level is: Splitting, in a granularity of a video data frame, the data into at least two substreams based on a mapping relationship between importance of a video data frame and a substream.

FIG. 6 is a schematic diagram of possible video data splitting transmission at a video data frame level according to an embodiment of the present invention. As shown in FIG. 6, a frame I is split into a substream 1, a frame B is split into a substream 2, and a frame P is split into a substream 3, respectively, for transmission.

Further, after data is split in a granularity of a video data frame, header information of a video data frame in a substream may further include a before-splitting DSN of the video data frame in addition to a substream data sequence number (DSN) of the video data frame in the post-splitting substream. Using FIG. 6 as an example, before splitting, original DSNs of an I1, a B1, a P1, an I2, a B2, and a P2 are 1, 2, 3, 4, 5, and 6, respectively. After the splitting, substream DSNs of the I1 and the I2 in the substream 1 are 1 and 2, substream DSNs of the B1 and the B2 in the substream 2 are 1 and 2, and substream DSNs of the P1 and the P2 in the substream 3 are 1 and 2.

2. Splitting at a NALU Level

The splitting at a NALU level is: Splitting, in a granularity of a NALU, the data into at least two substreams based on a mapping relationship between importance of a NALU in a video data frame and a substream.

Figure 7:
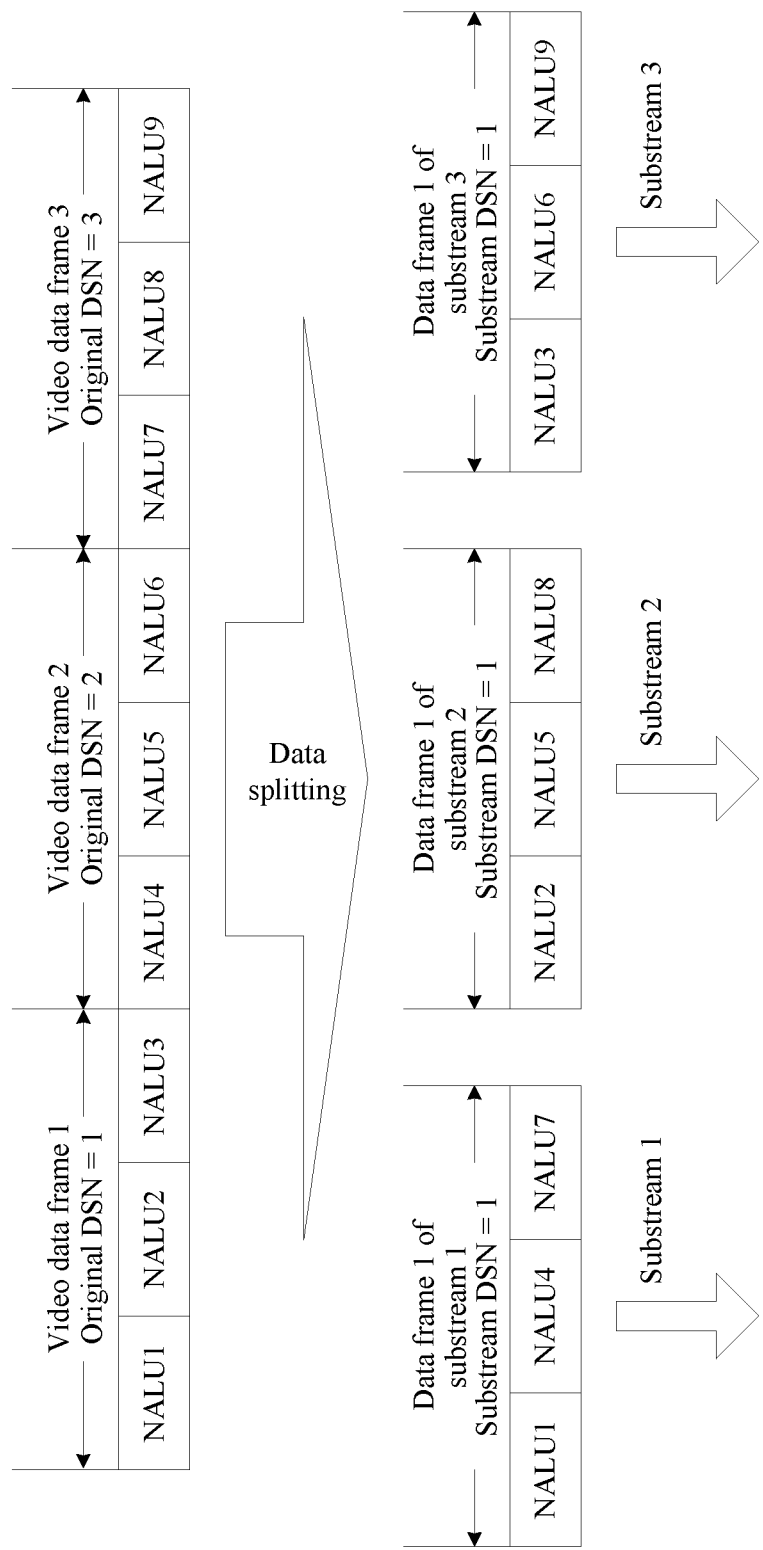
FIG. 7 is a schematic diagram of possible video data splitting at a NALU level according to an embodiment of the present invention.

FIG. 7 is a schematic diagram of possible video data splitting at a NALU level according to an embodiment of the present invention. As shown in FIG. 7, a data frame 1 includes a NALU1, a NALU2, and a NALU3; a data frame 2 includes a NALU4, a NALU5, and a NALU6; and a data frame 3 includes a NALU7, a NALU8, and a NALU9. A macroblock type included in the NALU1, the NALU4, and the NALU7 is an I-macroblock and an SI-macroblock; a macroblock type included in the NALU2, the NALU5, and the NALU8 is a P-macroblock; and a macroblock type included in the NALU3, the NALU6, and the NALU9 is a B-macroblock. After splitting processing based on NALU importance, the NALU1, the NALU4, and the NALU7 are split into a substream 1; the NALU2, the NALU5, and the NALU8 are split into a substream 2; and the NALU3, the NALU6, and the NALU9 are split into a substream 3.

Further, after data is split in a granularity of a NALU, header information of a video data frame in the substream may further include an original DSN that is corresponding to each NALU in the substream data frame in addition to a post-splitting substream DSN. Using FIG. 7 as an example, after splitting, the NALU1, the NALU4, and the NALU7 form a data frame 1 in the substream 1, and a corresponding substream DSN is 1; the NALU2, the NALU5, and the NALU8 form a data frame 1 in the substream 2, and a corresponding substream DSN is 1; and the NALU3, the NALU6, and the NALU9 form a data frame 1 in the substream 3, and a corresponding substream DSN is 1. Before splitting, original DSNs of the NALU1, the NALU2, and the NALU3 are 1; original DSNs of the NALU4, the NALU5, and the NALU6 are 2; and original DSNs of the NALU7, the NALU8, and the NALU9 are 3.

It can be understood that the video service transmission apparatus may support at least one splitting scheme. Further, in a scenario in which the video service transmission apparatus supports more than one splitting scheme, the video service transmission apparatus may further determine specifically which splitting scheme to be used based on a configuration parameter related to the splitting scheme.

The foregoing introduces the video service transmission method from a perspective of the video service transmission apparatus. The following describes the video service transmission method from a perspective of a video service receiving apparatus.

504: A video service receiving apparatus receives, from at least two bearers, data of at least two substreams.

The bearers are corresponding to the substreams based on a receive-end port number, and the data of the substreams is obtained by splitting video data based on a mapping relationship between importance of data in a video data frame and a substream.

505: The video service receiving apparatus performs aggregation processing on the data that is from the at least two substreams.

Specifically, corresponding to different data splitting manners used in 502, the aggregation processing that is performed by the video service receiving apparatus on the data received from the substreams may vary. The aggregation processing can be understood as an inverse process of the data splitting process in 502.

For example:

If splitting at a video data frame level is performed in 502, the video service receiving apparatus can aggregate the data of the substreams, and sort the aggregated data based on a before-splitting original DSN. The data herein exists in a form of a video data frame. As shown in FIG. 6, the video service receiving apparatus aggregates video data frames I1 and I2 of a substream 1, video data frames B1 and B2 of a substream 2, and video data frames P1 and P2 of a substream 3, and performs sorting based on before-splitting original DSNs of the I1, the I2, the B1, the B2, the P1, and the P2. The sorting result is: I1, B1, P1, I2, B2, and P2.

If splitting at a NALU level is performed in 502, the video service receiving apparatus first aggregates the data of the substreams, based on a before-splitting original DSN that is corresponding to a NALU in the data, combines the NALU to restore a before-splitting video data frame, and then sorts the generated video data frame based on the original DSN.

Figure 8:
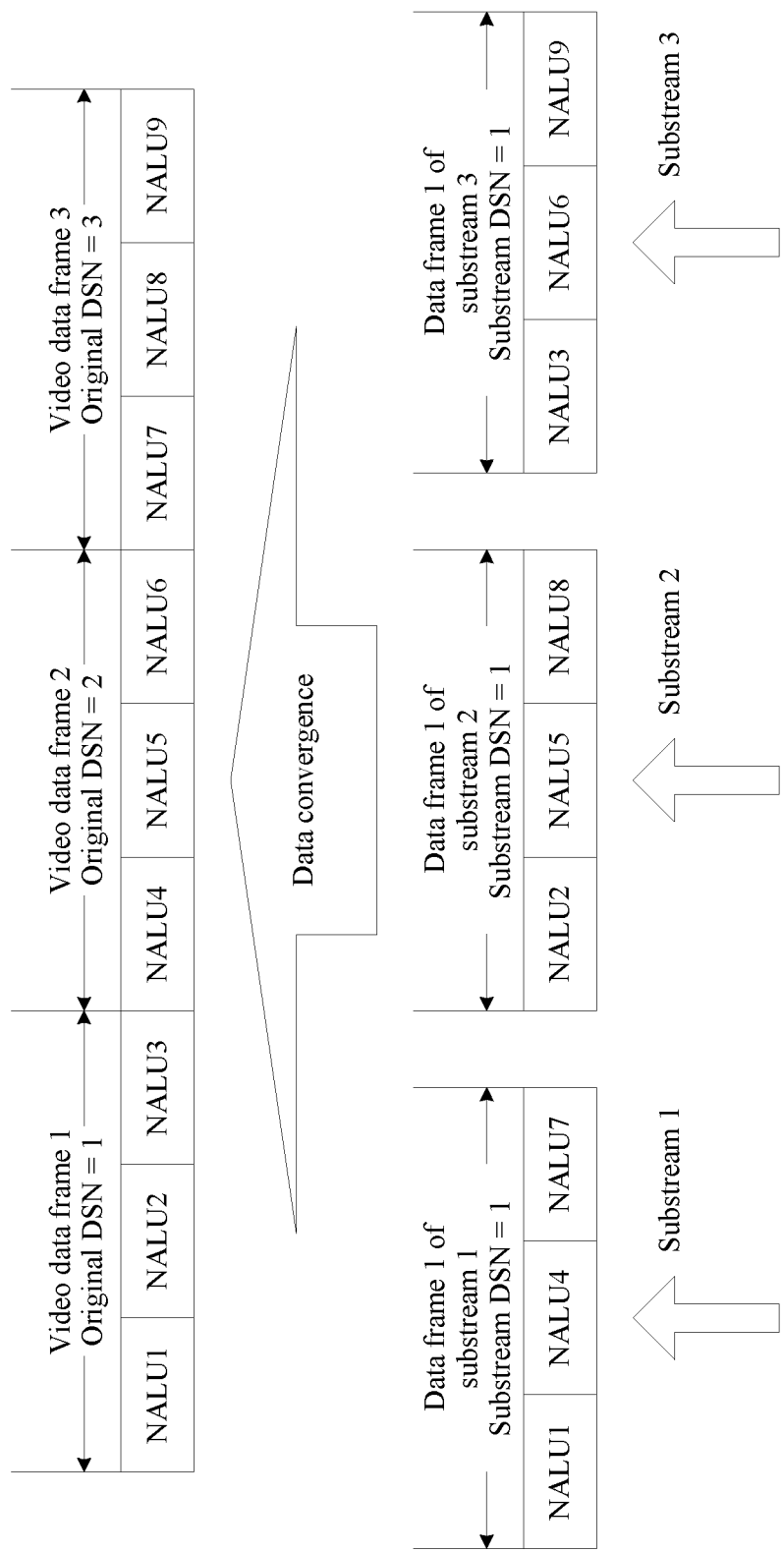
FIG. 8 is a schematic diagram of possible video data aggregation in a scenario of video data splitting at a NALU level according to an embodiment of the present invention.

FIG. 8 is a schematic diagram of possible video data aggregation in a scenario of video data splitting at a NALU level according to an embodiment of the present invention. As shown in FIG. 8, original DSNs of a NALU1, a NALU2, and a NALU3 are all 1, and the video service receiving apparatus re-combines the NALU1 of a substream 1, the NALU2 of a substream 2, and the NALU3 of a substream 3 to generate a video data frame 1. Original DSNs of a NALU4, a NALU5, and a NALU6 are all 2, and the video service receiving apparatus re-combines the NALU4 of a substream 1, the NALU5 of a substream 2, and the NALU6 of a substream 3 to generate a video data frame 2. Original DSNs of a NALU7, a NALU8, and a NALU9 are all 3, and the video service receiving apparatus re-combines the NALU7 of a substream 1, the NALU8 of a substream 2, and the NALU9 of a substream 3 to generate a video data frame 3. Then video data frames that are generated after the re-combination are sorted based on the original DSNs.

It can be understood that the video service receiving apparatus can support aggregation processing corresponding to at least one splitting scheme. The video service receiving apparatus determines a splitting scheme used for video service transmission before performing aggregation processing. Specifically, the video service receiving apparatus may determine the splitting scheme used for video service transmission by using a splitting scheme-related information element, where the splitting scheme-related information element may be included in a signaling message or may be included in the video data and sent by the video service transmission apparatus to the video service receiving apparatus. Alternatively, the video service receiving apparatus may determine the splitting scheme used for video service transmission by obtaining a characteristic of the video data frame. For example, when a splitting scheme at a NALU level is used, a post-splitting video data frame includes NALUs of a same type. However, when a splitting scheme at a video data frame level is used, a post-splitting video data frame includes various types of NALUs. For a scenario in which only one splitting scheme is supported, the splitting scheme supported by the video service receiving apparatus and the video service transmission apparatus may be specified.

The video service data after aggregation processing is decoded to obtain a before-encoding video.

For radio bearers with different QoS requirements, a radio access network (RAN) has a plurality of policies to ensure reliable transmission of data on a radio bearer of high importance with priority.

The RAN may use different network configuration parameters. For example, different radio link control (RLC) modes are used. For data on a radio bearer of high importance, an RLC acknowledged mode (AM) is used; for data on a radio bearer of low importance, an RLC unacknowledged mode (UM) is used. Alternatively, different quantities of retransmissions of a hybrid automatic repeat request (HARQ) are configured. For data on a radio bearer of high importance, a relatively large quantity of HARQ retransmissions is configured, for example, 6, so as to ensure reliable transmission of the data; for data on a radio bearer of low importance, a relatively small quantity of HARQ retransmissions is configured, for example, 2. In this way, in a scenario of constrained resources, reliable transmission of data of high importance may be ensured with priority.

The RAN may alternatively use different scheduling policies for different radio bearers, and allocate radio resources to the data on the radio bearer of high importance with priority. In this way, in a scenario of constrained resources, reliable transmission of data of high importance may be ensured with priority.

The RAN may alternatively map different radio bearers to different carriers for bearing. For example, in a carrier aggregation scenario, because a path loss of a low-frequency carrier is less than a path loss of a high-frequency carrier, a radio bearer of high importance may be mapped to the low-frequency carrier for transmission, and a radio bearer of low importance may be mapped to the high-frequency carrier for transmission.

The RAN may alternatively map different radio bearers to different spectrums for bearing. A licensed spectrum is a spectrum resource that may be controlled by an operator, and interference coordination and control can be performed effectively. An unlicensed spectrum is beyond control of the operator, and interferences and conflicts of which are uncontrollable. For data transmission on the unlicensed spectrum, a transmission bandwidth and delay cannot be ensured. However, due to low costs, using the unlicensed spectrum is an effective supplement to data transmission by operators. Therefore, the radio bearer of high importance may be mapped to the licensed spectrum for transmission, and the radio bearer of low importance may be mapped to the unlicensed spectrum for transmission.

The foregoing mainly describes the solutions provided in the embodiments of the present invention from a perspective of interaction between network elements. It can be understood that to implement the foregoing functions, the network elements such as the terminal, the video conference terminal, the eNB, the MME, the S-GW, the P-GW, the PCRF, the video server, and the video conference management server, the video service transmission apparatus, and the video service receiving apparatus include corresponding hardware structures and/or software modules for performing the functions. A person of ordinary skill in the art should easily be aware that units and solution steps in examples described with reference to the embodiments disclosed in the present invention can be implemented by hardware or a combination of hardware and computer software in the present invention. Whether a function is performed by hardware, computer software, or computer software driving hardware depends on particular applications and design constraints of the technical solutions. A person skilled in the art may use different methods to implement the described functions for each particular application, but it should not be considered that the implementation goes beyond the scope of the present invention.

Figure 9:
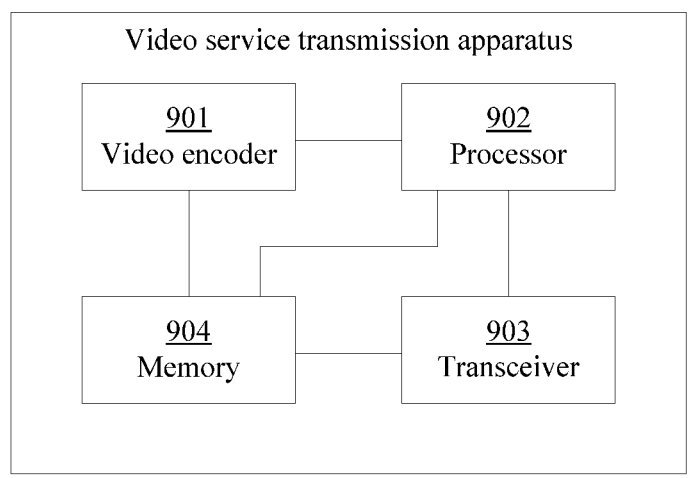
FIG. 9 is a schematic structural diagram of a possible video service transmission apparatus according to an embodiment of the present invention.

FIG. 9 is a schematic structural diagram of a possible video service transmission apparatus according to an embodiment of the present invention. The apparatus implements functions of the video service transmission apparatus in the video service transmission method described in FIG. 5, and therefore can implement the beneficial effects of the video service transmission method. The video service transmission apparatus includes a processor 902 and a transceiver 903.

The processor 902 is configured to determine importance of data in a video data frame, is configured to split the data in the video data frame into at least two substreams based on a mapping relationship between data importance and a substream, and is further configured to map, based on port numbers corresponding to the at least two substreams, data of the at least two substreams to bearers corresponding to the at least two substreams.

The transceiver 903 configured to transmit data on the bearer.

The video service transmission apparatus may further include a video encoder 901. The video encoder 901 is configured to encode a video to obtain a video data frame, and send the encoded video data frame to the processor 902 for processing.

The video service transmission apparatus may further include a memory 904. The memory 904 is configured to store program code and data in the video encoder 901, the processor 902, and the transceiver 903. The data stored in the memory 904 may include at least one of a mapping relationship between a frame type and frame importance, a mapping relationship between a NALU type and NALU importance, a mapping relationship from a macroblock to a slice group, and a mapping relationship between data importance and a substream.

Specifically, for a manner and a process of determining, by the processor 902, importance of data in a video data frame, refer to related descriptions in 501 in the foregoing method embodiments. For a manner and a process of splitting, by the processor 902, the data in the video data frame into at least two substreams based on a mapping relationship between data importance and a substream, refer to related descriptions in 502 in the foregoing method embodiments.

The processor 902 maps a macroblock in a video picture to a slice group, and sends slice group data of the video picture to the video encoder 901. For details about a manner and a process of mapping a macroblock to a slice group, refer to related descriptions in 501 in the foregoing method embodiments.

Specifically, for a manner and a process of mapping, by the processor 902 based on port numbers corresponding to the at least two substreams, data of the at least two substreams to bearers corresponding to the at least two substreams, refer to related descriptions in 503 in the foregoing method embodiments.

The processor 902 may further perform encryption processing, by using a secure transfer protocol, on the data of the substream that is mapped to the bearer.

The video service transmission apparatus in this embodiment of the present invention implements the steps/behaviors performed by the video service transmission apparatus in the foregoing method embodiments, and functions of each component of the video service transmission apparatus may be specifically implemented based on the method in the foregoing method embodiments. For a detailed specific implementation process, refer to related descriptions in the foregoing method embodiments.

It can be understood that FIG. 9 shows merely an embodiment of the video service transmission apparatus. In actual application, the video service transmission apparatus may include any quantity of video encoders, processors, transceivers, and memories. Any video service transmission apparatus that can implement this embodiment of the present invention falls within the protection scope of this application.

Figure 10:
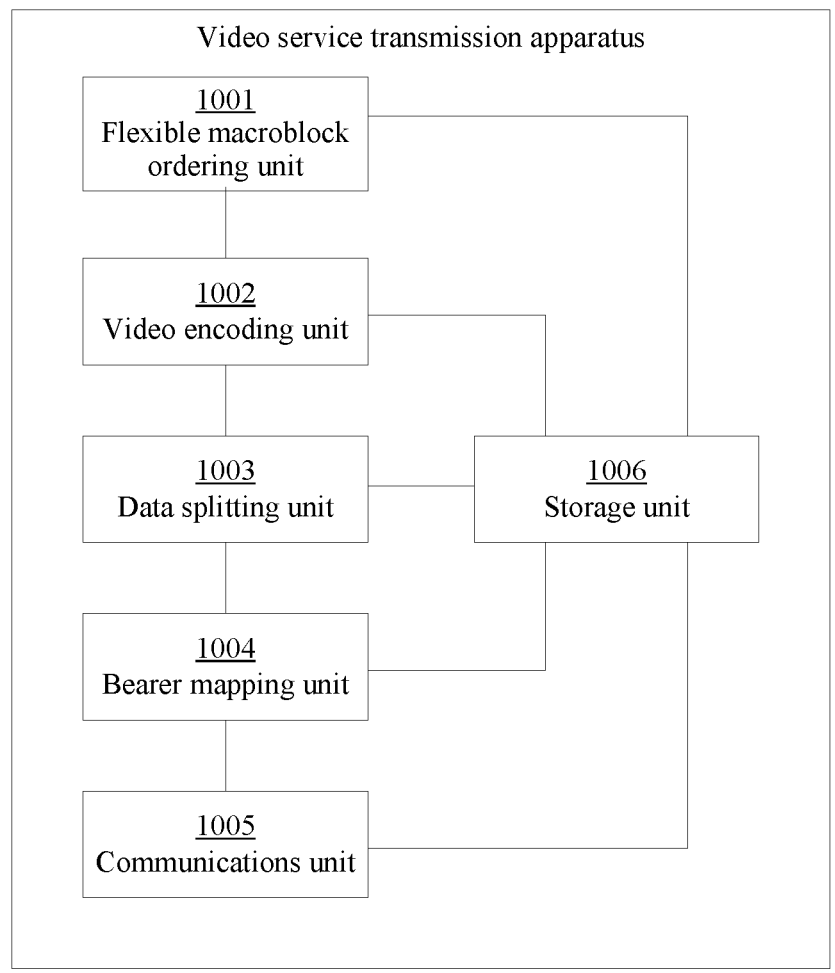
FIG. 10 is a schematic structural diagram of another possible video service transmission apparatus according to an embodiment of the present invention.

FIG. 10 is a schematic structural diagram of another possible video service transmission apparatus according to an embodiment of the present invention. The apparatus implements functions of the video service transmission apparatus in the video service transmission method described in FIG. 5, and therefore can implement the beneficial effects of the video service transmission method. The video service transmission apparatus includes a data splitting unit 1003, a bearer mapping unit 1004, and a communications unit 1005.

The data splitting unit 1003 is configured to determine importance of data in a video data frame, and is configured to split the data in the video data frame into at least two substreams based on a mapping relationship between data importance and a substream.

The bearer mapping unit 1004 is configured to map, based on port numbers corresponding to the at least two substreams, data of the at least two substreams to bearers corresponding to the at least two substreams. The communications unit 1005 is configured to transmit data on the bearer.

Specifically, for a manner and a process of determining, by the data splitting unit 1003, importance of data in a video data frame, refer to related descriptions in 501 in the foregoing method embodiments. For a manner and a process of splitting, by the data splitting unit 1003, the data in the video data frame into at least two substreams based on a mapping relationship between data importance and a substream, refer to related descriptions in 502 in the foregoing method embodiments.

Specifically, for a manner and a process of mapping, by the bearer mapping unit 1004 based on port numbers corresponding to the at least two substreams, data of the at least two substreams to bearers corresponding to the at least two substreams, refer to related descriptions in 503 in the foregoing method embodiments. The bearer mapping unit 1004 may further perform encryption processing, by using a secure transfer protocol, on the data of the substream that is mapped to the bearer.

The video service transmission apparatus may further include a video encoding unit 1002, configured to encode a video to obtain a video data frame, and send the encoded video data frame to the data splitting unit 1003 for splitting processing on the data.

The video service transmission apparatus may further include a flexible macroblock ordering unit 1001, configured to implement mapping from a macroblock to a slice group in a video picture, and send slice group data of the video picture to the video encoding unit 1002.

Specifically, for a data splitting scheme at a NALU level, there may be flexible mapping from a macroblock to a NALU. The flexible macroblock ordering unit 1001 may extend an existing FMO encoding method and define a new mapping pattern from a macroblock to a slice group. The mapping pattern may define which types of macroblocks are mapped to a same slice group.

The video service transmission apparatus may further include a storage unit 1006. The storage unit 1006 is configured to store related program code and data in the flexible macroblock ordering unit 1001, the video encoding unit 1002, the data splitting unit 1003, the bearer mapping unit 1004, and the communications unit 1005. The data stored in the storage unit 1006 may include at least a mapping relationship between a frame type and frame importance, a mapping relationship between a NALU type and NALU importance, a mapping relationship from a macroblock to a slice group, and a mapping relationship between data importance and a stream.

The video service transmission apparatus in this embodiment of the present invention implements the steps/behaviors performed by the video service transmission apparatus in the foregoing method embodiments, and functions of each component of the video service transmission apparatus may be specifically implemented based on the method in the foregoing method embodiments. For a detailed specific implementation process, refer to related descriptions in the foregoing method embodiments.

Figure 11:
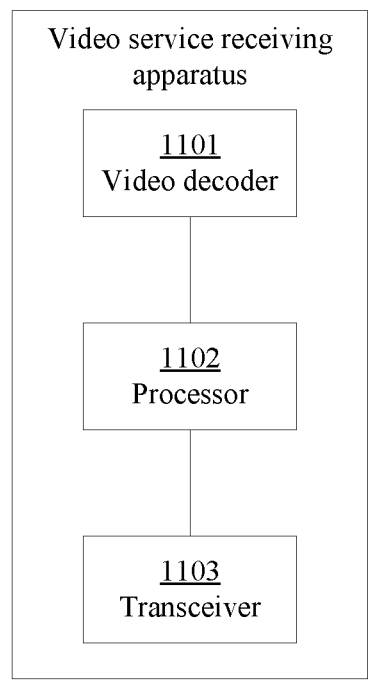
FIG. 11 is a schematic structural diagram of a possible video service receiving apparatus according to an embodiment of the present invention.

FIG. 11 is a schematic structural diagram of a possible video service receiving apparatus according to an embodiment of the present invention. The apparatus implements functions of the video service receiving apparatus in the video service transmission method described in FIG. 5, and therefore can implement the beneficial effects of the video service transmission method. The video service receiving apparatus includes a processor 1102 and a transceiver 1103.

The transceiver 1103 is configured to receive, from at least two bearers, data of at least two substreams, where the bearers are corresponding to the substreams based on a receive-end port number, and the data of the substreams is obtained by splitting video data based on a mapping relationship between importance of data in a video data frame and a substream. The processor 1102 is configured to perform aggregation processing on the data that is from the at least two substreams.

It can be understood that the video service receiving apparatus may further include a video decoder 1101, configured to decode the data after the aggregation processing, to obtain a before-encoding video.

Specifically, for a manner and a process of performing, by the processor 1102, aggregation processing on the data, refer to related descriptions in 505 in the foregoing method embodiments.

It can be understood that FIG. 11 shows merely an embodiment of the video service receiving apparatus. In actual application, the video service receiving apparatus may include any quantity of video decoders, processors, and transceivers. Any video service receiving apparatus that can implement the present invention falls within the protection scope of this application.

Figure 12:
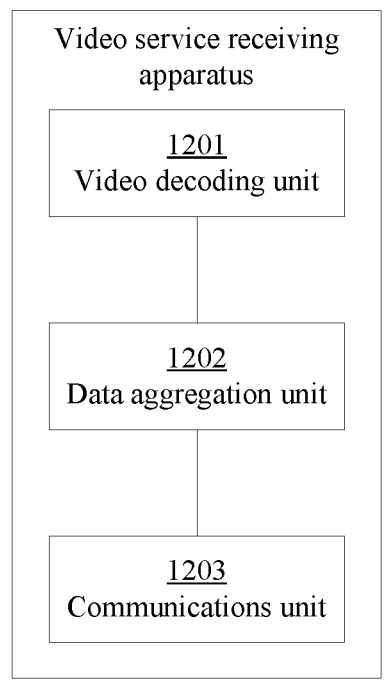
FIG. 12 is a schematic structural diagram of another possible video service receiving apparatus according to an embodiment of the present invention.

FIG. 12 is a schematic structural diagram of another possible video service receiving apparatus according to an embodiment of the present invention. The apparatus implements functions of the video service receiving apparatus in the video service transmission method described in FIG. 5, and therefore can implement the beneficial effects of the video service transmission method. The video service receiving apparatus includes a data aggregation unit 1202 and a communications unit 1203.

The communications unit 1203 is configured to receive, from at least two bearers, data of at least two substreams, where the bearers are corresponding to the substreams based on a receive-end port number, and the data of the substreams is obtained by splitting video data based on a mapping relationship between importance of data in a video data frame and a substream.

The data aggregation unit 1202 is configured to perform aggregation processing on the data that is from the at least two substreams.

The video service receiving apparatus may further include a video decoding unit 1201, configured to decode the data after the aggregation processing, to obtain a before-encoding video.

Specifically, for a manner and a process of performing, by the data aggregation unit 1202, aggregation processing on the data, refer to related descriptions in 505 in the foregoing method embodiments.

The processor configured to perform a function of the foregoing video service transmission apparatus and the video service receiving apparatus terminal may be a central processing unit (CPU), a general-purpose processor, a digital signal processor (DSP), an application-specific integrated circuit (ASIC), a field programmable gate array (FPGA) or another programmable logic device, a transistor logic device, a hardware component, or any combination thereof. The processor can implement or execute various example logical functions and modules that are described with reference to the content disclosed in the present invention.

A person skilled in the art should be aware that in one or more of the foregoing examples, the functions described in the present invention may be implemented by using hardware, software, firmware, or any combination thereof. When the functions are implemented by software, these functions may be stored in a computer-readable medium or transmitted as one or more instructions or code in the computer-readable medium. The computer-readable medium includes a computer storage medium and a communications medium, where the communications medium includes any medium that facilitates transmission of a computer program or related information from one place to another. The storage medium may be any available medium accessible to a general-purpose or dedicated computer.

In the foregoing specific implementations, the objectives, technical solutions, and benefits of the present invention are further described in detail. It should be understood that the foregoing descriptions are merely specific implementations of the present invention, but are not intended to limit the protection scope of the present invention. Any modification, equivalent replacement, or improvement made based on the technical solutions of the present invention shall fall within the protection scope of the present invention.

What is claimed is:

1. A video service transmission method, wherein the method comprises:
    determining importance of data in a video data frame;
    splitting the data in the video data frame into at least two substreams based on a mapping relationship between data importance and a substream;
    mapping, based on port numbers corresponding to the at least two substreams, data of the at least two substreams to bearers corresponding to the at least two substreams, for transmission, wherein each of the bearers is associated with a different data importance, wherein the mapping further comprises:
        determining, based on a stream number of the substream, a media sub-component description corresponding to the substream,
        determining a transmit-end port number in the media sub-component description,
        determining the bearer corresponding to the substream based on the transmit-end port number, and
        mapping the data of the substream to the bearer corresponding to the sub stream, for transmission; and
    transmitting, based on the mapping, each substream using a corresponding bearer.

2. The video service transmission method according to claim 1, wherein the determining importance of data in the video data frame comprises: determining importance of the video data frame, or determining importance of a network abstract layer unit (NALU) in the video data frame.

3. The video service transmission method according to claim 2, wherein the determining importance of the video data frame comprises:
    obtaining a frame type of the video data frame; and
    determining the importance of the video data frame based on a mapping relationship between a frame type and frame importance.

4. The video service transmission method according to claim 2, wherein the determining importance of the NALU in the video data frame comprises:
    obtaining a NALU type of the NALU in the video data frame; and
    determining the importance of the NALU based on a mapping relationship between the NALU type and NALU importance.

5. The video service transmission method according to claim 1, wherein the splitting the data in the video data frame into at least two substreams based on the mapping relationship between data importance and the substream comprises:

splitting, in a granularity of a video data frame, the data into the at least two substreams based on a mapping relationship between video data frame importance and a sub stream; or splitting, in a granularity of a NALU, the data into the at least two substreams based on a mapping relationship between importance of a NALU in a video data frame and a substream.

6. The video service transmission method according to claim 1, wherein the bearers corresponding to the substream are transmitted using a Transmission Control Protocol (TCP), a User Datagram Protocol (UDP), or a combination thereof.

7. The video service transmission method according to claim 1, wherein the transmitting, based on the mapping, each substream using the corresponding bearer further comprises: transmitting, by using a secure transfer protocol, the data of the substream that is mapped to the bearer.

8. A video service transmission apparatus, comprising:
a processor, configured to determine importance of data in a video data frame and split the data in the video data frame into at least two substreams based on a mapping relationship between data importance and a substream, and further configured to map, based on port numbers corresponding to the at least two substreams, data of the at least two substreams to bearers corresponding to the at least two substreams, wherein each of the bearers is associated with a different data importance, and wherein the processor configured to map further comprises the processor configured to:
determine, based on a stream number of the substream, a media sub-component description corresponding to the substream,
determine a transmit-end port number in the media sub-component description,
determine the bearer corresponding to the substream based on the transmit-end port number, and
map the data of the substream to the bearer corresponding to the substream, for transmission; and
a transceiver, configured to transmit, based on the mapping, each substream using a corresponding bearer.

9. The video service transmission apparatus according to claim 8, wherein the processor is configured to determine importance of the video data frame or determine importance of a network abstract layer unit (NALU) in the video data frame.

10. The video service transmission apparatus according to claim 9, wherein the processor is further configured to:
obtain a frame type of the video data frame; and
determine the importance of the video data frame based on a mapping relationship between a frame type and frame importance.

11. The video service transmission apparatus according to claim 9, wherein the processor is further configured to:
obtain a NALU type of the NALU in the video data frame; and
determine the importance of the NALU based on a mapping relationship between a NALU type and NALU importance.

12. The video service transmission apparatus according to claim 8, wherein the processor is further configured to:
split, in a granularity of a video data frame, the data into the at least two substreams based on a mapping relationship between video data frame importance and a sub stream; or split, in a granularity of a NALU, the data into the at least two substreams based on a mapping relationship between importance of a NALU in a video data frame and a substream.

13. The video service transmission apparatus according to claim 8, further comprising:
a memory, configured to store at least one of a mapping relationship between a frame type and frame importance, a mapping relationship between a NALU type and NALU importance, a mapping relationship from a macroblock to a slice group, and a mapping relationship between data importance and a substream.

14. The video service transmission apparatus according to claim 8, wherein the processor is further configured to perform encryption processing, by using a secure transfer protocol, on the data of the substream that is mapped to the bearer.

15. A video service receiving apparatus, comprising:
a transceiver, configured to receive, from at least two bearers, data of at least two substreams, wherein the bearers correspond to the substreams based on a receive-end port number, and the data of the substreams is received from video data that is split by a video transmission apparatus into the at least two substreams based on a mapping relationship between importance of data in a video data frame and a substream, the importance of the data in the video data frame used for the mapping relationship determined by the video transmission apparatus, wherein each of the bearers is associated with a different data importance of video data, and wherein the mapping relationship is formed based on: a media sub-component description corresponding to the substream determined based on a stream number of the substream, a determined transmit-end port number in the media sub-component description, the bearer corresponding to the substream determined based on the transmit-end port number, and the data of the sub stream being mapped, for transmission by the video transmission apparatus, to the bearer corresponding to the substream; and
a processor, configured to perform aggregation processing on the data that is from the at least two substreams.

16. The video service receiving apparatus according to claim 15, wherein the processor is further configured to determine a splitting scheme used for video service transmission by using a splitting scheme-related information element.

17. The video service receiving apparatus according to claim 15, wherein the processor is further configured to:
aggregate the data of the at least two substreams, and sort the aggregated data based on a before-splitting original data sequence number (DSN); or
aggregate the data of the at least two substreams, based on a before-splitting original DSN that corresponds to a network abstract layer unit (NALU) in the data, combine the NALU to restore a before-splitting video data frame, and sort the video data frame based on the original DSN.

18. The video service receiving apparatus according to claim 15, wherein the video service receiving apparatus is any one of a terminal, a video conference terminal, and a video conference management server.

* * * * *